W. D. SLACK.
HARVESTER.
No. 95,526. Patented Oct. 5, 1869.
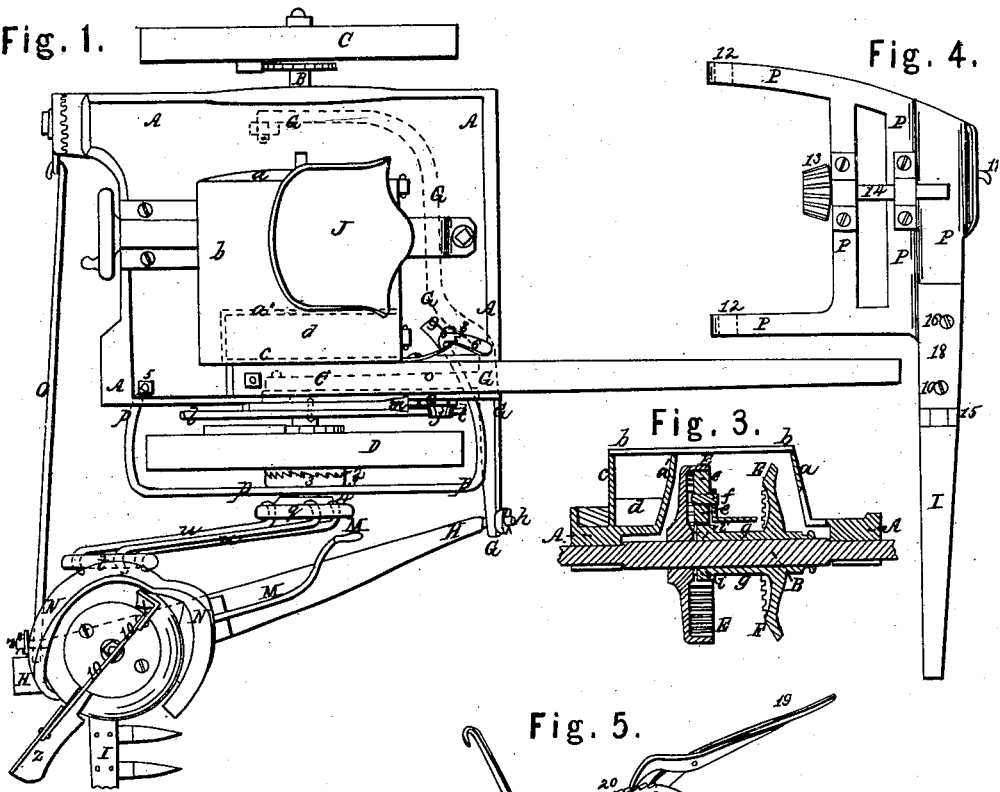
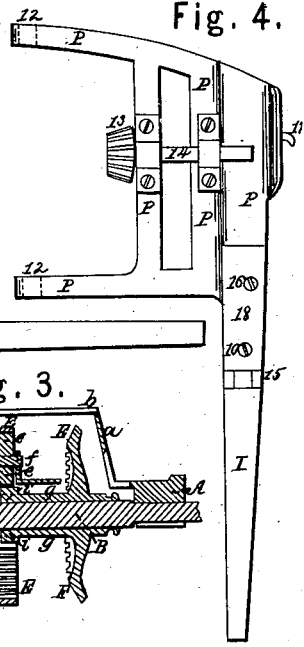
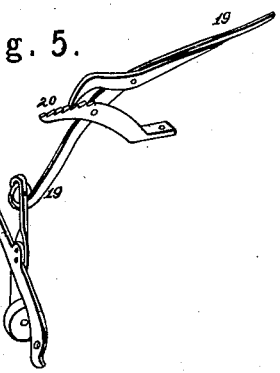
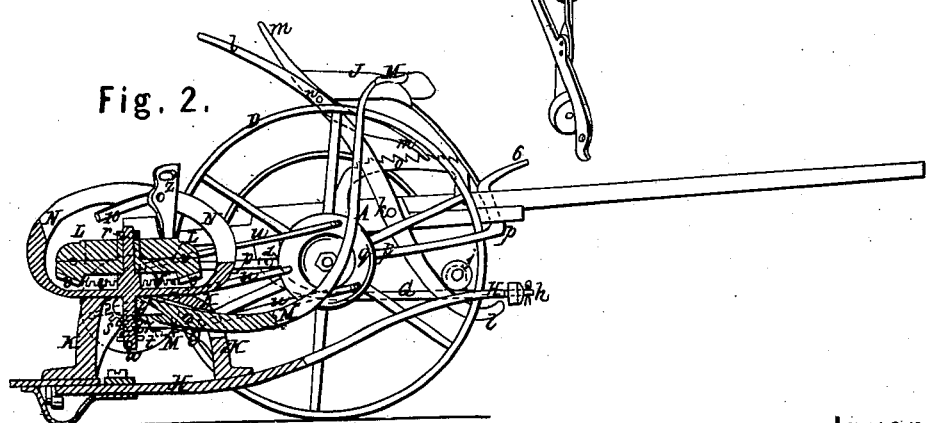
Witnesses.
Jno. D. Patton
Edmund Mason
Inventor.
William D. Slack.
By atty A. B. Stoughton

UNITED STATES PATENT OFFICE.

WILLIAM D. SLACK, OF LEWISBURG, PENNSYLVANIA.

IMPROVEMENT IN HARVESTERS.

Specification forming part of Letters Patent No. 95,526, dated October 5, 1869.

*To all whom it may concern:*

Be it known that I, WILLIAM D. SLACK, of Lewisburg, in the county of Union and State of Pennsylvania, have invented certain new and useful Improvements in Harvesting-Machines and Rakes Therefor; and I do hereby declare the following to be a full, clear, and exact description of the same, reference being had to the accompanying drawings, making a part of this specification, in which—

Figure 1 represents a top plan of so much of a harvesting-machine as will illustrate my invention. Fig. 2 represents a side elevation thereof, partly in section. Fig. 3 represents a section through the gears, gear-house, and tool-box and their cover, which is common to all of them. Fig. 4 represents the manner of connecting the finger-bar, &c., when a front-cut machine is desired, instead of a rear-cut, as shown in Figs. 1 and 2.

Similar letters of reference, where they occur in the separate figures, denote like parts of the machine in all of the drawings.

My invention relates, first, to certain mechanism for raising, lowering, and holding at any properly-desired height the finger-bar and cutting apparatus.

My invention relates, secondly, to certain mechanism for clutching and unclutching the rake and reel driving mechanism with and from the main driving-wheel.

My invention relates, thirdly, to mechanism for throwing the rake and reel arms into and out of action without throwing its driving mechanism out of gear with the main drive-wheel.

To enable others skilled in the art to make and use my invention, I will proceed to describe the same with reference to the drawings.

The main frame A may be cast in one single piece, with suitable openings, recesses, or projections for adapting to it the varied parts of the machine that are carried on, supported by, or driven from said main frame. On the main frame are suitable bearings for the main axle B to rest and turn in, and upon this axle is placed the main carrying and driving-wheels C D, each of them having a ratchet and spring-pawl connection, so that they may be fast or loose on the axle, as the case may be, and for the usual well-known object and purpose. In this frame and in the central portion of it there is left in the casting of it an opening of sufficient size to allow the driving-wheels E F on the main axle to pass into and through and be operated therein; and upon the frame, at the ends laterally of this opening, are cast the arched pieces $a\ a'$, that form, together with the curved and hinged cover $b$, the gear-house for covering the gears and keeping them free from clogging matter, but still of easy access for oiling or any other purpose. Adjacent to one of the arched pieces $a'$ there is cast onto the frame a third similar-shaped piece, $c$, which with the one $a'$, the frame, and the hinged cover $b$, forms the tool-box $d$, the same cover, $b$, covering it that covers the gearing.

The gear E is an internal-gear wheel, and it runs a pinion, $e$, hung on a journal, $f$. The gear F is formed on a sleeve or boss, $g$, that is loose upon the axle B, so that it can be moved thereon by a shipper-lever, and upon the end of this sleeve or boss $g$ there is a pinion, $i$, that is thrown into and out of action with the pinion $e$ whenever desired to do so, and by this arrangement of gears the wheel F is driven from the main axle or stopped as may be required, and the wheel F works into the pinion on the crank-shaft that drives the cutters.

To the main frame A, and to its under portion, and aft of but near to the main axle B, and in suitable hinged bearings, there is attached, as at 1, Fig. 2, a frame, G, shown in dotted lines, Fig. 1, to the forward grain-side termination of which is pivoted, as at $h$, the drag-bar H, on which the finger-bar I is fastened and on which is also placed the rake and reel and certain mechanism for operating said rake and reel, as will be hereinafter explained.

On this hinged frame G there is a friction pulley or roller, $j$, and to the main frame at $k$ there is pivoted a curved lever, $l$, the upper end of which is in convenient position to be operated by the driver in his seat J, and the lower end is curved around so as to take under said roller $j$, and by operating said lever the frame G and drag-bar H connected to it can be raised and lowered at pleasure, or held up at any proper height by means of a pawl-lever, $m$, pivoted to the lifting-lever $l$ at $n$, and taking into the notched rack $o$ on the main frame, and holding there.

On the end or point of the hub of the drive-wheel D there is a semi-clutch, 2, and upon the end of the axle B, which projects beyond the hub of the said wheel, there is a semi-clutch, 3, the two, when forced together, forming a complete clutch and turning with said wheel. On the semi-clutch 3 there is a neck, groove, or depression, 4, in which a clutch-rod, $p$, lies, and beyond this neck portion 4 there is connected with said semi-clutch or formed on it the crank-wheel $q$, by which the head that carries the rakes or beaters is revolved. The clutch-rod $p$ is fastened to the main frame at 5, and extending first outward, then forward, then inward, as clearly shown in Fig. 1. Its free end 6 passes up through a slot, 7, in the main frame, and is formed into a foot-piece, which the driver in his seat can actuate, said free end of the clutch-rod being controlled in one direction by a spring, 8, bearing against which spring tends to hold the half-clutches in gear, while the pressure of the foot upon the part 6 tends to unclutch the crank or wrist wheel $q$ from the drive-wheel D, and thus cease to drive the rake-gear.

On the heel end or rear end of the drag-bar H there is a pillow-block, K, on which is placed and supported by means of a journal or spindle, $r$, a rake-driving head, L, which is turned on said journal by means of a bevel-pinion, $s$, which is on and a part of a crank-wheel, $t$, driven from the crank-wheel $q$ through the pitman $u\ u\ u$, said beveled pinion $s$ gearing into the bevel-cogs $v$ on the under side of the rake-driving head L. The united crank-wheel and bevel-pinion $t\ s$ are supported on an under journal, $w$, and are held up by a spring, $x$, to keep said pinion in gear with the rake-driving head L. A bent lever, M, is pivoted to the pillow-block K at 9, and its short arm straddles the bearer $y$, that carries the journal on which the crank-wheel and bevel-pinion $t\ s$ revolve, and the long arm extends up into convenient position for the driver in his seat to seize and operate. By drawing this lever M rearward at its top it carries down the bearer $y$ on the journal $w$, compressing the spring $x$, and thus moves down the bevel-pinion $s$, and throwing it out of gear with the rake-driving head L and stopping the action of the rakes. When the lever M is released by the operator the reaction of the spring $x$ moves up the bearer and the bevel-pinion, and the rakes are then put into action again. The pinion is not necessarily a part of the crank-wheel.

The rake-holders $z\ z$, of which I have shown but two, (but there may be four, if desired, or more,) are pivoted to the driving-head L, so as to rise and fall as they go around with the head, but to so rise and fall in slots or recesses as not to move or be strained laterally, and the rake-holders are united by a coupling-rod, 10, so that as one rises up the other shall fall, and vice versa, one of the pair being controlled by a camway, N, on the pillow-block, and so alternately as they sweep around.

The drag-bar H, as heretofore stated, is pivoted at its front end, as at $h$, to the hinged frame or braces G, so that it can rock or roll as well as be raised up at its forward end. The rear end of the drag-bar H is connected to the main frame by a coupling-bar, O, in such manner, as seen at 11, Fig. 1, as that it can freely rock or roll at that end as well as at its front end.

As the rakes and rake-driving mechanism are connected to and placed on the drag-bar and the latter is free to roll on its pivots, and as the driving-power comes from the main wheels on the main frame, which does not or may not move as the drag-bar does, some flexible driving-connection other than a chain or band must be used, as they would become slack and taut by such movements, and be uncertain and unreliable. To admit of this free movement of the drag-bar at front, rear, and laterally, I use coupling-links or pitmen $u$, as heretofore patented to me, which are rigid, so far as their transmission of motion is concerned, and flexible to any extent that a finger-bar may require, or give to the drag-bar to which it is united.

The machine as above described is constructed for a rear-cut machine. To make it a front-cut machine, which some farmers prefer, the braces G and drag-bar H may be removed, and a frame, P, as shown in Fig. 4, hinged to the main axle B by the loops or dead-eyes at 12. This frame has upon it a bevel-pinion, 13, on a shaft, 14, to the forward end of which shaft the crank-wheel that drives the cutters is attached, the driving motion coming from the bevel-gear F, Fig. 3, on the main axle through the bevel-pinion 13 and crank-wheel shaft 14. The finger-bar I is hinged to the frame P, as at 15, by a gag-hinge, so that while the finger-bar may rise and fall at its outer end freely in conforming to the ground it can be raised up bodily from the ground by raising up the frame P, which can be done by a chain attached to the hook 17 and a lever connected therewith and extending toward the driver in his seat, so that he may operate it. The hinge-joint at 15 being of the rule or gag kind, the finger-bar cannot be uncoupled readily at the hinge; but that it may be taken off easily, the screws 16, that unite the hinge-plate 18 to the frame P, can be taken out, which releases said plate and finger-bar without separating them.

I have shown the main frame A, which is cast in one piece, as being entirely between the drive-wheels. It can be cast and I propose to so cast and make it as to extend beyond and around one or both of the drive-wheels, leaving an opening or openings through it for said drive or carrying wheels to pass through or work in, and still have it in one piece; or the outside pieces may be made separate and bolted to the main frame by means of proper projections on one or both of them, and serve a similar purpose.

At Fig. 5 I have shown detached the raising mechanism for raising, lowering, and holding the coupling-bar $o$, which apparatus is to be arranged on the rear right-hand corner of the main frame. The lifting and pawl lever is shown at 19, the ratchet-bar at 20.

Having thus fully described my invention, what I claim therein as new, and desire to secure by Letters Patent, is—

1. The arrangement of the lever $l$, roller $j$, pawl-lever $m$, and rack $o$ for raising, lowering, and holding at any suitable adjusted height the frame G, to which the drag-bar that carries the finger bar and cutters is attached, substantially as described.

2. In combination with the rake-driving head L and the pinion-supporting spring-bearer $y$, a bent and pivoted lever, M, for throwing the pinion out of gear with said head while it is thrown in by a spring, substantially as described.

3. In combination with the semi-clutches 2 3, one on the drive-wheel and the other on the the main axle, the clutch bar or rod $p$, constructed and operating as described, and connected therewith, and extending to near the driver's seat, so that the driver from his seat may clutch and unclutch the driving-connection, as and for the purpose described.

WILLIAM D. SLACK.

Witnesses:
   CHARLES S. WOLFE,
   D. G. STURDEVANT.